United States Patent [19]

Tanaka

[11] Patent Number: 4,755,869
[45] Date of Patent: Jul. 5, 1988

[54] IMAGE PROJECTION/IMAGING APPARATUS

[75] Inventor: Atsushi Tanaka, Kawasaki, Japan

[73] Assignee: Canon Kabushiki Kaisha, Tokyo, Japan

[21] Appl. No.: 907,748

[22] Filed: Sep. 16, 1986

[30] Foreign Application Priority Data

Sep. 26, 1985 [JP] Japan .................................. 60-213144

[51] Int. Cl.⁴ .......................................... H04N 3/012
[52] U.S. Cl. ......................................... 358/60; 358/61; 358/231; 358/236; 358/209
[58] Field of Search ........................ 358/60, 61, 63, 75, 358/231, 232, 236, 209, 286

[56] References Cited

U.S. PATENT DOCUMENTS 4,366,500  12/1982  Kurtz ..................................... 358/61
4,380,023  4/1983   Mir ........................................ 358/60
4,393,411  7/1983   Amtower ............................. 358/286
4,574,312  3/1986   Anderson ............................ 358/236
4,656,521  4/1987   Trzeciak ............................. 358/231

Primary Examiner—Michael A. Masinick
Attorney, Agent, or Firm—Fitzpatrick, Cella, Harper & Scinto

[57] ABSTRACT

An image projection/imaging apparatus comprises a lens system, a light shutter, pattern forming means for forming an image pattern on the light shutter, projection control means for projecting the image pattern formed on the light shutter onto a focus plane by the lens system, photo-electric conversion means for converting the object image to an electrical signal, and imaging control means for projecting the object image onto the photo-electric conversion means through the lens system and the light shutter.

17 Claims, 4 Drawing Sheets

IMAGE PROJECTION/IMAGING APPARATUS

BACKGROUND OF THE INENTION

1. Field of the Invention

The present invention relates to a projection/imaging apparatus having a function for projecting an image and a function for imaging.

2. Related Background Art

An image projection apparatus which uses film or sheets such as a slide projector or an overhead projector, and an image projection apparatus which uses an electro-optical effect of liquid crystal or liquid crystal light bulb which uses an electro-thermal-optical effect are known. The projection apparatus which uses the light valve drives the light valve by means of an electric field or heat in accordance with image data from a computer, to project an image on a screen by controlling light projected by the light bulb.

Imaging apparatus include a camera for photographing an object on a photographic film and a video camera which reads an object by means of an imaging tube or a solid-state imaging device to produce an image signal.

In the past, those two types of apparatus have been separate. Accordingly, when a user uses both functions, he/she must have both the projection apparatus and the imaging apparatus. As a result, the manipulation is complex and the expense is high.

SUMMARY OF THE INVENTION

It is an object of the present invention to provide an image projection/imaging apparatus having both projection and imaging functions.

It is another object of the present invention to provide an image projection/imaging apparatus which can be rapidly switched between a projection mode and an imaging mode.

It is another object of the present invention to provide a multi-function image projection/imaging apparatus capable of reading an object to produce an electrical signal and projecting an image represented by an image signal.

DESCRIPTION OF THE PREFERRED EMBODIMENTS

Figure 1:
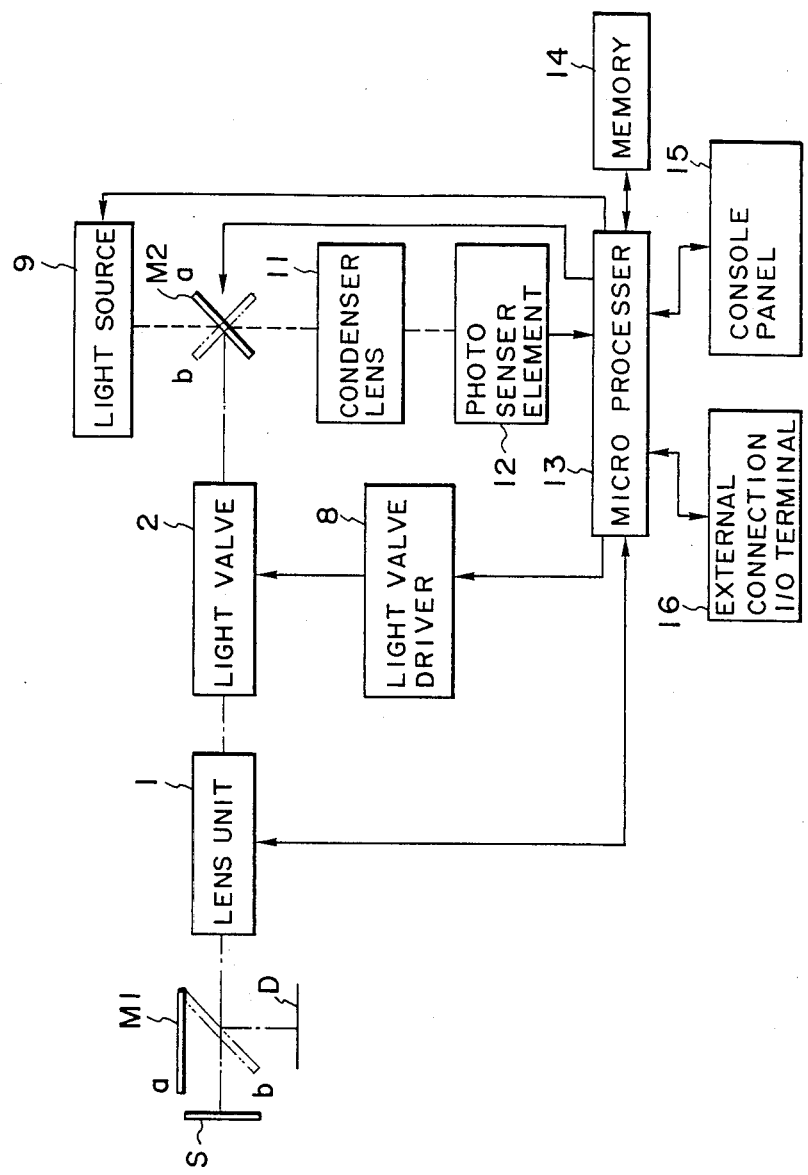
FIG. 1 shows a configuration of one embodiment of the present invention.
Figure 2:
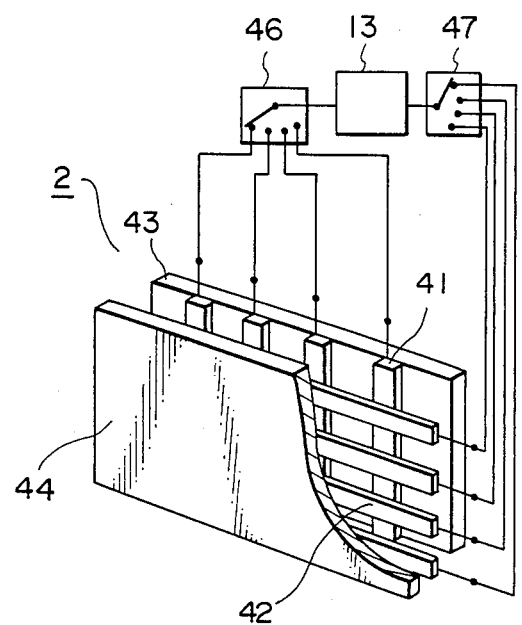
FIG. 2 shows a partial perspective view of a light valve.

FIG. 1 shows an embodiment of an image projection/imaging apparatus in accordance with the present invention. Numeral 1 denotes a lens unit for focusing an image onto a screen S or a light valve 2 in a projection mode or an imaging mode, numeral 2 denotes the light valve for controlling transmission of light, numeral 8 denotes a device for driving the light valve, numeral 9 denotes a light source for uniformly illuminating the light valve 2, M1 and M2 denote rotatable mirrors for switching a light path between the projection mode and the imaging mode, numeral 11 denotes a condenser lens for condensing light on the light valve to a photodetector (photosensor element) in the projection mode, numeral 12 denotes the photodetector for detecting the light from the object in the imaging mode, numeral 13 denotes a microprocessor for controlling the apparatus, numeral 14 denotes a memory for storing a projection image and a picked-up image, numeral 15 denotes a console panel and numeral 16 denotes input/output terminal for connection with other devices. The console panel 15 includes a mode selection switch to select the projection mode or the imaging mode. D denotes an object such as document or book mounted on an object table.

The mirrors M1 and M2 are coupled to drive sources, and in the projection mode, they are at positions a shown by solid lines to form a projection light path to project the light valve 2 onto the screen S and an illumination light path to illuminate the light valve 2 by the light source 9, and in the imaging mode, they are moved to positions b shown by broken lines to from an imaging path to project the object D to the photodetector 12.

Figure 3:
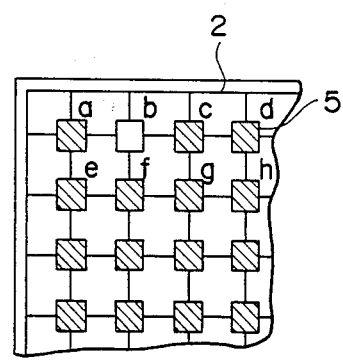
FIG. 3 illustrates the light valve.

The light valve 2 is constructed by a liquid crystal light shutter. FIG. 3 shows a basic construction of the liquid crystal light shutter in which transparent glass supports 43 and 44 having a number of stripe-shaped transparent electrodes 41 and 42 arranged threreon in matrix are put facing each other and liquid crystal is filled therebetween. The electrodes 41 and 42 may be transparent conductive films such as tin oxide $SnO_2$ or indium oxide $In_2O_3$. The electrode surfaces are divided into stripes by etching and lead wires are attached to the respective divided electrodes. The liquid crystal is essentially opaque before an electric field is applied, and when the electric field is applied, the light transmission factor of the liquid crystal changes so that the liquid crystal becomes substantially transparent. When the electric field is removed, it returns to the original opaque state.

When voltages are applied to the two orthogonal electrode stripes 41 and 42, a portion of the liquid crystal at a crosspoint of the energized electrodes becomes substantially transparent to transmit light and a portion of the liquid crystal at a crosspoint of the two nonenergized electrodes becomes substantially opaque to block light.

The portions corresponding to the crosspoints of the electrode stripes 41 and 42 from pixels 5 which control the light transmission factors as shown in FIG. 3. A number of pixels 5 are sequentially turned on and off such as in a sequence of a, b, c, d, e, f, . . . so that the respective pixels are sequentially rendered transparent, and the image of the object D is read by the photodetector 12 to produce an electrical signal representing the image, or the pixels are turned on and off to form an image pattern representing the image signal on the light valve 2. The light valve 2 is driven by sequentially applying voltages to the electrodes 41 and 42 in accordance with the signal from the microprocessor 13, by an X-axis switching circuit 46 and a Y-axis switching circuit 47 which form the light valve driver 8. A resolution power of the image is determined by pitches of the stripe-shaped electrodes 41 and 42. Focus adjustment and exposure control of the lens unit 1 are carried out by commands of the microprocessor 13.

The operation in the projection mode will now be explained. When the projection mode is selected, the electrical image signal from the memory 14 or the input/output terminal is sent to the light valve driver 8 through the microprocessor 13 to drive the light valve 2 so that the light valve 2 forms an image pattern corresponding to the image signal. The light source 9 is now on and the mirrors M1 and M2 are at the position a shown in FIG. 3. The light from the light source 9 is reflected by the mirror M2, the light transmission is controlled by the light valve 2, and the transmitted light is projected onto the screen S through the projection/imaging lens unit 6 so that the image pattern is projected onto the screen S.

When the imaging mode is selected, the light source 9 is turned off and the mirrors M1 and M2 are moved to the position b to direct the light from the object D to the photodetector. The light from the illuminated object D is focused on the light valve 2 through the projection/imaging lens unit 6. The pixels of the light valve 2 are sequentially turned on and off for the image and the light intensities at the respective pixel positions of the image are detected by the photodetector 12 through the condenser lens 11 and it is sent to the memory 14 or the input/output terminal 16 as the image data through the microprocessor 13. In this manner, both projection function and imaging function are attained. The configuration shown in FIG. 1 is a mere illustration. Alternatively, the projection/imaging lens unit, light valve and light source may be arranged on a straight line and the photodetector may be inserted between the light valve and the light source only in the imaging mode.

Figure 4:
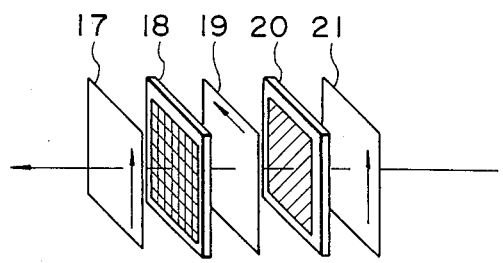
FIG. 4 shows a color light shutter which uses a DAP type liquid crystal filter.
Figure 5:
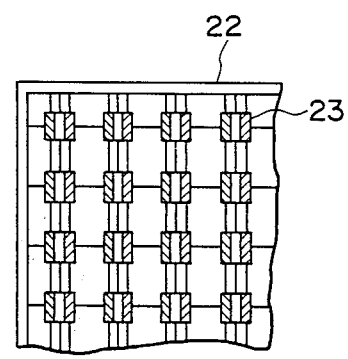
FIG. 5 shows a front view of another color light shutter.

In accordance with the present invention, a color image can be projected and imaged. FIG. 4 shows an embodiment therefore. Numerals 17, 19 and 21 denote polarizer plates, numeral 18 denotes a light valve similar to that described above, and numeral 20 denotes a DAP type liquid crystal filter which can change color of transmission light by a voltage. In synchronism with the operation of the light valve 18, the filter 20 is operated to provide a required color at the pixel positions so that the color image is projected. In the imaging mode, the filter 20 is sequentially changed to red(R), green(G) and blue(B). The light intensities for the three colors for each pixel are detected by the photodetector 12, and they are processed by the microprocessor to determine the drive voltage to the filter 20 and the drive voltage to the light valve 18. The color image may be projected and imaged by methods shown in FIGS. 5 and 6. FIG. 5 shows the light valve. Each pixel 20 of the light valve is divided into three colors R, G and B which are separately controlled to display a color image by proportions of R, G and B. The imaging is carried out by sequentially turning on and off the R, G and B and detecting the light intensities thereof.

Figure 6:
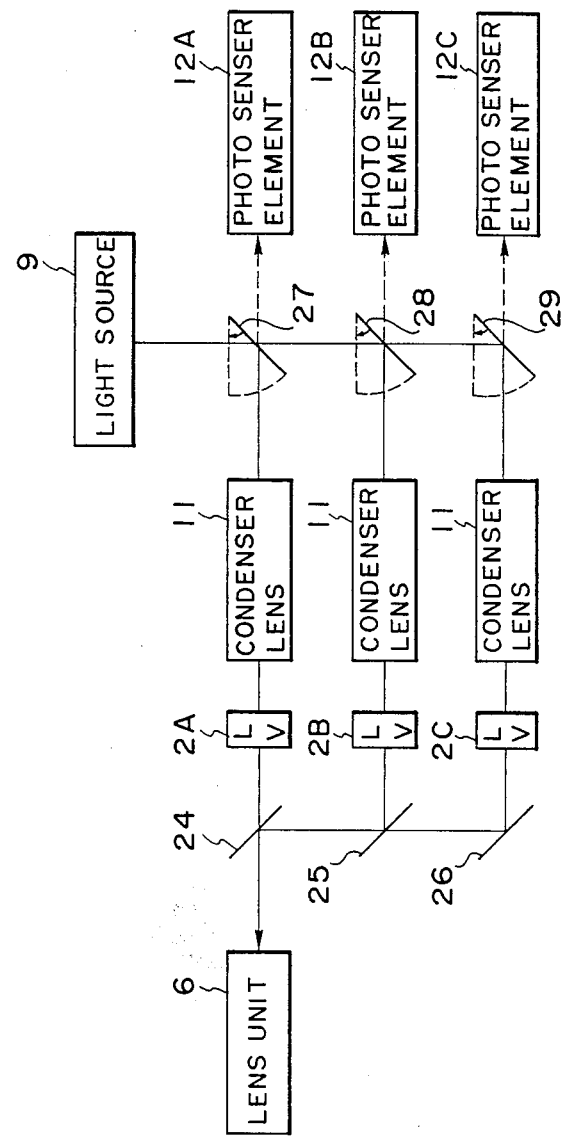
FIG. 6 shows a configuration of an embodiment of a color image projection/imaging apparatus.

In FIG. 6, separate light valves 2A, 2B and 2C and photodetectors 12A, 12B and 12C are provided for the three colors R, G, and B. Numerals 24, 25 and 26 denote dichroic mirrors for decomposing white lights into three colors R, G and B. Light paths for the respective colors are separated and the imaging is carried out independently. In the imaging mode, the lights controlled by the light valves 2A, 2B and 2C are extracted by the dichroic mirrors 24, 25 and 26, respectively, and they are combined to project the color image.

The image data can be inputted and outputted through the external input/output terminal 16 and the interface is provided to allow connection until other devices so that more applications are permitted. For example, a printer, a CRT display or a facsimile may be connected or a similar device or a camputer may be connected through a telephone line. Thus, a more multifunction image input/output apparatus is provided.

As explained above, both the projection function and the imaging function are attained by using components common to both modes so that an inexpensive and easy-to-handle projection/imaging apparatus is provided.

The light shutter is not limited to the liquid crystal but electrochromic material whose light transmission factor reversibly changes with an electric field, PLLT(polycrystal of compound of lead, lanthanum, zirconium and titanium) or a material whose light transmission factor changes by a magneto-optical effect. In the present embodiment, only one photodetector is used. Alternatively, a plurality of photodetectors may be used. For example, a two-dimensional or two-dimensional image sensor such as a photo-diode array or a CCD may be used to read the image of the object.

The photodetector produces an analog image signal in accordance with the density of the image, and it is converted to a binary signal by an A/D converter and it is sent to the memory 14 or the input/output terminal 16.

The object D may be arranged on the light path to the screen so that the mirror M1 may be omitted. The screen may be a white board on which information is written by a sign pen or the like and the information may be erased. In the imaging mode, the information written on the white board is read by the photodetector, and in the projection mode, the information written on the white board is erased and the image pattern formed on the light valve is projected onto the white board.

I claim:

1. An image projection/imaging apparatus, comprising:
   light shutter means;
   pattern forming means for forming an image pattern on said light shutter means;
   illuminating means for illuminating said light shutter means;
   a first light path for guiding light from said illuminating means through said light shutter means to a focus plane
   a second light path for guiding light from the object through said light shutter means to a photo-electric conversion means; and
   selecting means for selectively forming either of said first and said second light paths.

2. An image projection/imaging apparatus according to claim 1, wherein said selecting means has a movable mirror for selectively for projecting the image of the object onto said light shutter means and a second one of said optical paths being for projecting the image pattern formed on said light shutter means onto said focus plane.

3. An image projection/imaging apparatus according to claim 2, wherein said selecting means has a second movable mirror for selectively forming either of two optical paths, a first one of said optical paths being for guiding the light of said illuminating means to said light shutter means and a second one of said optical paths being for guiding light which has passed through said light shutter means to said photo-electric conversion means.

4. An image projection/imaging apparatus according to claim 1, wherein said photo-electric conversion means includes one or more photodetector.

5. An image projection/imaging apparatus according to claim 1, wherein said light shutter means is made of a material whose light transmission factor is variable with an electric field.

6. An image projection/imaging apparatus according to claim 5, wherein said material is a liquid crystal material.

7. An image projection/imaging apparatus according to claim 5, wherein said material is an electro-chromic material.

8. An image projection/imaging apparatus according to claim 5, wherein said material is PLZT.

9. An image projection/imaging apparatus according to claim 1, wherein said light shutter means includes a plurality of light control units arranged in a matrix and the light transmission factors of which can be controlled independently.

10. An image projection/imaging apparatus according to claim 1, further comprising filter means for controlling wavelength of the light transmitted through said light shutter means.

11. An image input/output apparatus, comprising:
light valve means comprising a plurality of areas, arranged in a matrix, each said area being changeable selectively into either of a transparent condition and an opaque condition;
control means for driving said areas of said light valve means so as to cause each said area respectively and selectively to assume either of said transparent condition and said opaque condition;
detecting means for detecting light which has passed through any of said areas of said light valve means;
path selecting means for selectively forming a first optical path for projecting the light which has passed through said areas of said light valve means to a predetermined position and a second optical path for projecting the light from the object onto the respective said areas of said light valve means; and
mode selecting means for selecting either of an image input mode and an image output mode,
wherein either of said first and said second optical paths, is selectively formed, on the basis of an output signal of said mode selecting means.

12. An image projection/imaging apparatus according to claim 11, wherein said light valve means is made of a material whose light transmission factor is variable with an electric field.

13. An image projection/imaging apparatus according to claim 11, further comprising filter means for controlling wavelength of the light transmitted through said light valve means.

14. An image projection/imaging apparatus according to claim 11, wherein a screen is arranged at said predetermined position.

15. An apparatus according to claim 11, wherein said control means comprises first control means for selectively driving said respective areas of said light valve means in response to a signal of the image, and second control means for driving said areas of said light valve means in a predetermined order, and wherein the ones of said areas selected by said first control means assume the transparent condition and ones of said areas are changed into the transparent condition by said control means in said predetermined order.

16. A display apparatus having a function for displaying an image and a function for reading an original image, said apparatus comprising:
a display panel having a plurality of display elements two-dimensionally arranged and each selectively changeable into either of a transparent condition and an opaque condition;
drive means for selectively driving said display elements of said display panel;
a first optical path for projecting an image displayed on said display panel onto a screen;
a second optical path for projecting an original image onto said display panel;
illuminating means for illuminating said display elements onto said display panel;
photo-detecting means for detecting the transparent condition of said display elements of said display panel;
a third optical path for projecting the light emitted from said illuminating means onto said display panel;
a fourth optical path for projecting the light which has passed through the display elements of said display panel onto said photo-detecting means;
mode selecting means for selecting either of an image display mode and an original image reading mode; and
optical path selecting means for selectively forming either said first and third optical paths, or said second and fourth optical paths, on the basis of an output signal from said mode selecting means.

17. An apparatus according to claim 16, further comprising means for storing the signal generated by said photo-detecting means.

* * * * *

UNITED STATES PATENT AND TRADEMARK OFFICE
CERTIFICATE OF CORRECTION

PATENT NO. : 4,755,869
DATED : July 5, 1988
INVENTOR(S) : ATSUSHI TANAKA

It is certified that error appears in the above-identified patent and that said Letters Patent is hereby corrected as shown below:

IN THE DRAWINGS

Sheet 1, Figure 1, "PHOTO SENSER" should read --PHOTO SENSOR--
    Sheet 1, Figure 1, "MICRO PROCESSER" should read --MICRO PROCESSOR--.
    Sheet 4, Figure 6, "PHOTO SENSER" should read --PHOTO SENSOR-- (three occurrences).

COLUMN 1

Line 14, "bulb" should read --valve--.

COLUMN 2

Line 13, "document" should read --a document--.
    Line 48, "from" should read --form--.

COLUMN 3

Line 33, "therefore." should read --therefor.--.
    Line 66, "until" should read --with--.

COLUMN 4

Line 1, "camputer" should read --computer--.
    Line 9, "but" should read --but may also be, e.g.,--.
    Line 11, "PLLT(polyscrystal" should read --PLZT (polyscrystal--.
    Line 16, "two-dimensional" should read --one-dimensional--.

UNITED STATES PATENT AND TRADEMARK OFFICE
CERTIFICATE OF CORRECTION

PATENT NO. : 4,755,869
DATED : July 5, 1988
INVENTOR(S) : ATSUSHI TANAKA

It is certified that error appears in the above-identified patent and that said Letters Patent is hereby corrected as shown below:

COLUMN 4 (continued)

Line 43, "plane" should read --plane;--.
    Line 51, "for" (second occurrence) should be deleted.
    Line 68, "photodetector." should read --photodetectors.--.

COLUMN 5

Line 45, "projection/imaging" should read --input/output--.
    Line 49, "projection/imaging" should read --input/output--.

COLUMN 6

Line 3, "projection/imaging" should read --input/output--.
    Line 10, "light means" should read --light valve means--.
    Line 14, "said control" should read --said second control--.

Signed and Sealed this

Twenty-eighth Day of February, 1989

Attest:

DONALD J. QUIGG

*Attesting Officer*    *Commissioner of Patents and Trademarks*